United States Patent
Kadyk et al.

(10) Patent No.: US 7,046,691 B1
(45) Date of Patent: May 16, 2006

(54) METHODS AND SYSTEMS FOR DYNAMIC CONVERSION OF OBJECTS FROM ONE FORMAT TYPE TO ANOTHER FORMAT TYPE BY SELECTIVELY USING AN INTERMEDIARY FORMAT TYPE

(75) Inventors: Donald Kadyk, Bothell, WA (US); Neil Fishman, Bothell, WA (US); Marc E. Seinfeld, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 924 days.

(21) Appl. No.: 09/609,269

(22) Filed: Jun. 30, 2000

Related U.S. Application Data

(63) Continuation-in-part of application No. 09/411,594, filed on Oct. 4, 1999.

(51) Int. Cl.
*H04J 3/22* (2006.01)
(52) U.S. Cl. ............ 370/466; 379/100.13; 379/142.14
(58) Field of Classification Search ................ 370/465, 370/466
See application file for complete search history.

(56) References Cited

U.S. PATENT DOCUMENTS

| | | | |
|---|---|---|---|
| 5,119,465 A | 6/1992 | Jack et al. ................... | 395/500 |
| 5,283,887 A | 2/1994 | Zachery ...................... | 395/500 |
| 5,406,557 A | 4/1995 | Baudoin | |
| 5,608,786 A | 3/1997 | Gordon | |
| 5,727,158 A | 3/1998 | Bouziane ................ | 395/200.55 |
| 5,946,629 A * | 8/1999 | Sawyer et al. .............. | 455/466 |
| 6,047,002 A * | 4/2000 | Hartmann et al. .......... | 370/466 |
| 6,167,122 A * | 12/2000 | Titmuss et al. .......... | 379/93.15 |
| 6,195,662 B1 | 2/2001 | Ellis et al. | |
| 6,493,105 B1 * | 12/2002 | Onuma ...................... | 358/1.15 |
| 6,674,767 B1 * | 1/2004 | Kadyk et al. ............... | 370/466 |
| 6,741,608 B1 * | 5/2004 | Bouis et al. ................ | 370/465 |
| 2005/0157857 A1 * | 7/2005 | Lockwood ............... | 379/88.17 |

FOREIGN PATENT DOCUMENTS

EP    0872990    10/1998

* cited by examiner

*Primary Examiner*—Chi Pham
*Assistant Examiner*—Anh-Vu Ly
(74) *Attorney, Agent, or Firm*—Workman Nydegger

(57) ABSTRACT

The dynamic conversion of a data structure from an origin data format into a destination data format is described. Instead of using a single data conversion module to accomplish this data conversion, a gateway computer system identifies a sequence of format conversion modules that, when executed in sequence, converts the data structure from the origin to the destination data format. The conversion occurs dynamically during run time and reduces the amount of needed data conversion modules significantly, particularly when there is a large amount of possible origin data formats and destination data formats. This conversion is particularly useful when communicating over wireless networks since there is little standardization in wireless devices resulting in wireless devices having many different proprietary data formats.

37 Claims, 6 Drawing Sheets

| ADDRESS (510) | DATA FORMAT (520) | REGISTRATION DATA (530) |
|---|---|---|
| 1-800-555-1212 | CONTACT 2 | • • • |
| 1-900-555-1212 | CONTACT 1 | • • • |
| www.domainname.com | vCARD | • • • |

METHODS AND SYSTEMS FOR DYNAMIC CONVERSION OF OBJECTS FROM ONE FORMAT TYPE TO ANOTHER FORMAT TYPE BY SELECTIVELY USING AN INTERMEDIARY FORMAT TYPE

CROSS-REFERENCE TO RELATED APPLICATIONS

The present application is a continuation-in-part of U.S. patent application Ser. No. 09/411,594 filed Oct. 4, 1999, which is incorporated herein by reference in its entirety.

BACKGROUND OF THE INVENTION

1. The Field of the Invention

The present invention relates to data processing systems. Specifically, the present invention relates to methods and systems for dynamically converting data objects from one format to another format by selectively using an intermediary format during run time.

2. The Prior State of the Art

In the computer age, computer systems play a major role in nearly every aspect of society. Computer systems essentially include a processor which implements a computer program to provide a desired service. In accomplishing the desired service, the computer program includes data that is read and processed as dictated by processor-executable instructions that are also included within the computer program. Even in hardwired logic circuitry that lack a processor, data is input into the hardwired logic to produce a desired result. Thus, the ability to evaluate data is essential to the operation of computer programs and hardwired logic circuitry. In the remainder of this application, the primary focus will be on computer programs handling data though hardwired logic circuitry may also handle data.

Computer programs are configured to operate on data that has a particular format. A "data format" is essentially a set of rules or conventions that define the layout of data fields within a data structure as well as how to interpret the values within those data fields. All useful data is stored in a particular format with the expectation that it will be read by a computer program or a hardwired logic circuit that can interpret that format.

There are perhaps thousands of different data formats in use. Some computer programs will be able to handle certain data format, but not others. It is essential to the proper operation of a computer program that the data be stored in the format recognized by the computer program. Therefore, various data format conversion programs are available so that data may be used by a particular computer program that it would not otherwise be able to use.

For example, data conversion can occur within a single format category such as sound. Certain data conversion programs may be able to convert sound from a ".ABS" MPEG audio sound file to an ".MP3" MPEG audio layer 3 sound file for computer programs that can handle the ".MP3" sound file, but which cannot handle the ".ABS" sound file. Other data conversion programs may convert data format from one format category such as picture data formats to other format categories such as text data formats. Optical character recognition software may, for example, recognize text characters represented within a picture file and convert the recognized text into a text file. Of course, sometimes data conversion results in a loss of data. For example, if the original picture file included graphics as well as text, the graphics may be ignored by the optical character recognition software.

In order to use such data conversion programs, a user typically has to initiate execution of the data conversion program in the hopes that the program will be able to perform the desired data conversion. This takes user effort and can often result in the execution of a data conversion program that is not able to handle the desired data conversion. There is often a single data conversion module that can handle a data conversion from one format to another data format. However, since new data formats are introduced at a rapid pace and since data formats are so numerous, there is often no single data conversion module that can convert data from certain data format into other certain data formats. Therefore, what are desired are methods and systems for dynamically converting data structures from one format to another automatically even when there is no single data conversion module that can perform the data conversion alone.

SUMMARY OF THE INVENTION

These and other problems with the prior art are overcome by the present invention which is directed towards the dynamic conversion a data structure from an origin data format into a destination data format. The conversion may occur automatically upon the receipt of a given data structure without requiring any user intervention. Also, the conversion is supported even if there is no single data conversion module that is available for converting the data structure from the origin format into the destination format.

A suitable operating environment for use with the present invention may be a gateway computer system which connects two or more networks. A computer system on one of the networks generates and forwards a data structure such as a message to the gateway computer system. The gateway computer system converts the message to be in a format that is recognized by the destination computer system and then routes the message to the destination computer system.

If a single format conversion module is capable of handling this data conversion, then the gateway computer system may most likely use that format conversion module to convert the message. However, if no single format conversion module is capable of handling the data conversion, the gateway computer system identifies a sequence of format conversion modules that, when executed in sequence, converts the data structure from the origin to the destination data format. The first data conversion module in the sequence is executed to first convert the data structure from the origin data format into an intermediate data format. Then, the remainder of the data conversion modules in the sequence is then executed in series to convert the data structure from the intermediate data format into the destination data format.

The present method reduces the amount of data conversion modules that the gateway computer system needs to store in order to be able to handle conversions from a fixed number of origin data formats into a fixed number of destination data formats. For example, suppose that the gateway computer system is to handle the conversion of 1000 origin data formats into 1000 destination formats. In this case, the gateway computer system would need to handle hundreds of thousands of different types of data conversions. Requiring a dedicated conversion module for each possible data conversion possibility would expend large amounts of memory. Allowing a sequence of two or more data conversion modules to perform conversions significantly reduces the number of different data conversion modules required to be available for supporting all possible data conversions.

Also, using a sequence of modules rather than a single module to perform conversions dramatically simplifies the process of enabling the gateway computer system to handle conversions to and from a new data format. If a single data conversion module was to handle conversion to the new format for each possible origin data format, 1000 new data conversion modules would be required, one for each possible origin data format. However, the present invention only requires that there be one data conversion module that converts from a data format that the gateway computer system knows how to generate into the new data format. That conversion module would then be used as the last module in the sequence of modules that perform the conversion.

Great benefit may be derived from the present invention when communicating between two networks which have devices that produce and recognize numerous data formats. These networks would result in the need to convert from numerous origin data format into numerous destination data formats when sending data structures from devices on one network to devices on another network. Since there is little standardization in data formats from one wireless device to the next, the present invention is especially useful in communicating to and from wireless networks. Furthermore, since the method may be implemented dynamically as each message is received, the present invention facilitates real time communication with such wireless devices.

Additional advantages of the invention will be set forth in the description which follows, and in part will be obvious from the description, or may be learned by the practice of the invention. The advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
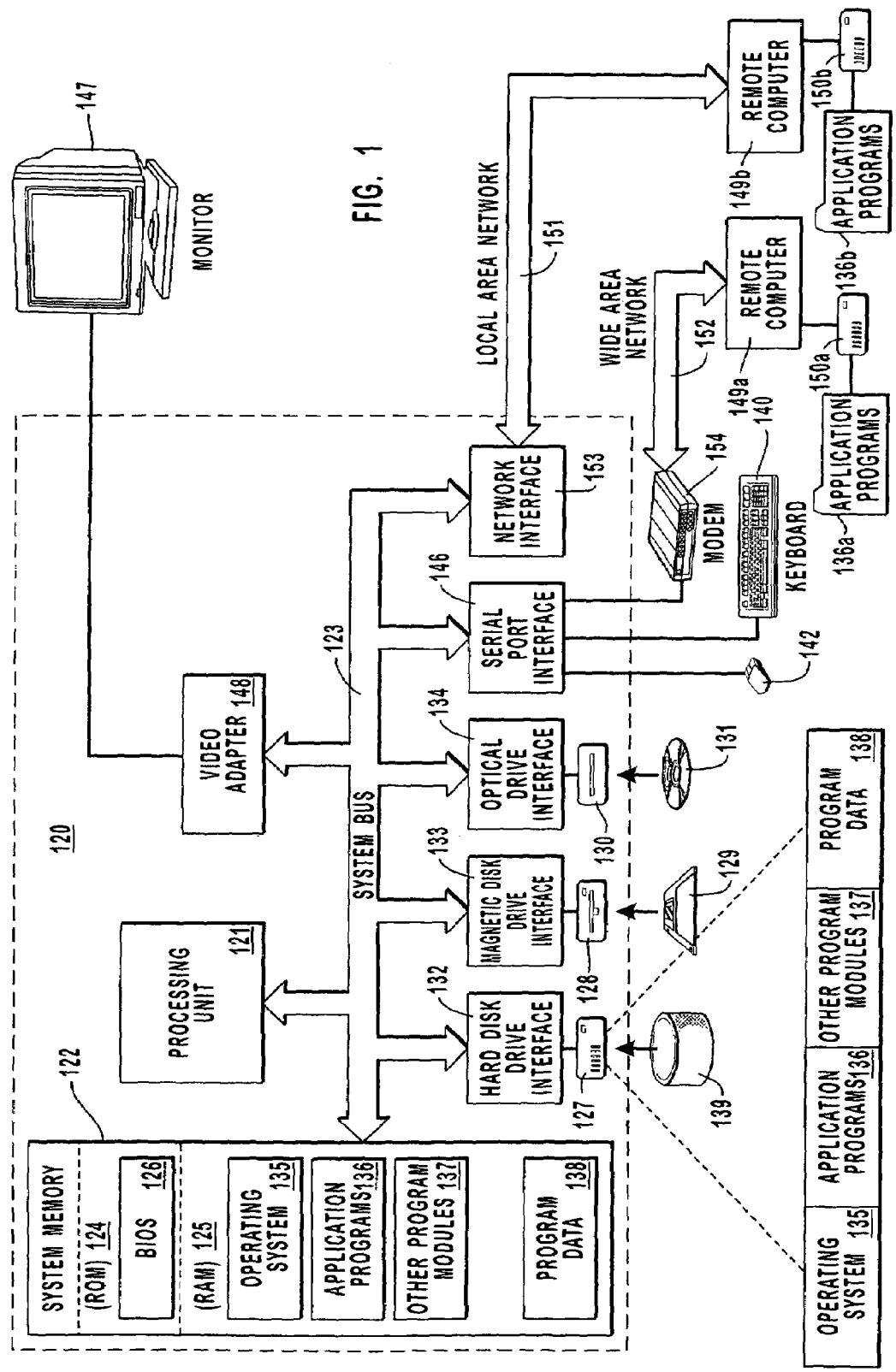
FIG. 1 illustrates an exemplary system that provides a suitable operating environment for the present invention.

The invention relates to a way of dynamically converting a data structure from one data format into another data format using an intermediary data format during run time. During run time, a locator module determines a sequence of data format conversion modules that when executed in series would convert the original data format into the destination format. The first data conversion module in the sequence converts the data structure from the original data format into the intermediary data format. The rest of the data conversion modules then converts the data structure from the intermediary data format into the destination data format. In one embodiment, this method is implemented in a gateway computer system which converts to and from numerous data formats that are used in a variety of wireless devices network connectable to the gateway computer system.

Since the data conversion is accomplished using a sequence of data conversion modules rather than using a single data conversion module, the number of data conversion modules needed to convert from a wide variety of original data formats into a wide variety of destination data formats is significantly reduced. The reduction is especially significant when communicating to and from wireless devices since there is less data format standardization among wireless devices.

The invention is described below by using diagrams to illustrate either the structure or processing of embodiments used to implement the systems and methods of the present invention. Using the diagrams in this manner to present the invention should not be construed as limiting of its scope. The present invention contemplates both methods and systems for forwarding messages from an origination device to a destination device. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage mediums such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Such a medium may include a wireless carrier signal, for example. When information is transferred or provided over a network or another communications connection (either hardwired, wireless or a combination of hardwired and wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination or hardwired and wireless links) through a communications network. In a distributed computing environment, program modules may be located in both local and remote memory storage devices.

FIG. 1 illustrates a conventional computer 120 that includes components and data processing capabilities that may be used to implement embodiments of the invention. Computer 120 is a general purpose computing device that includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joystick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically includes many or all of the elements described above relative to the computer 120, although only memory storage devices 150a and 150b an their association application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include, for example, a modem 154 or a wireless link. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means for establishing communications over wide area network 152 may be used.

Figure 2:
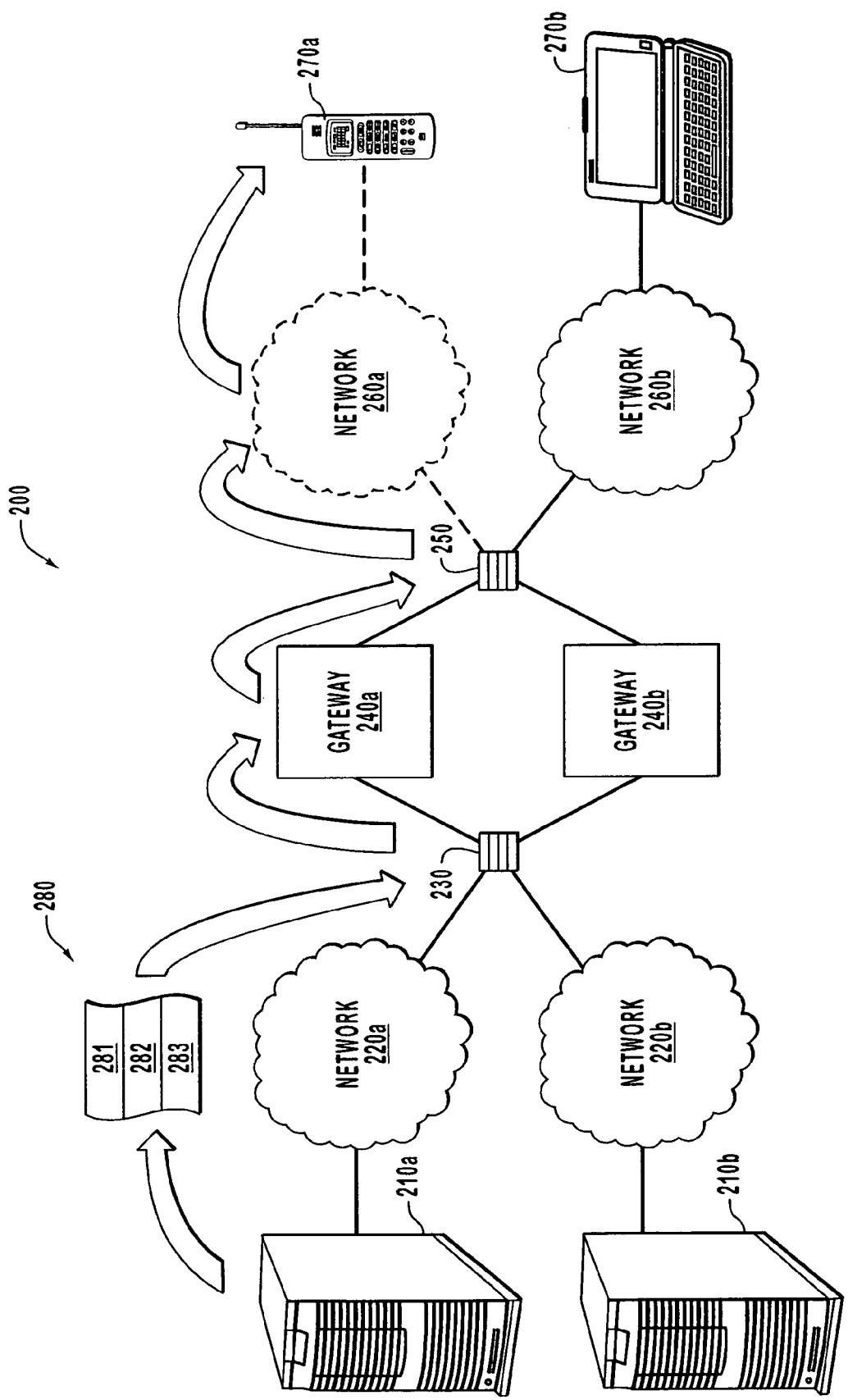
FIG. 2 is a schematic diagram showing the passage of a message through a gateway computer system in accordance with the present invention.

FIG. 2 shows a schematic diagram of a scalable environment 200 that is suitable for the present invention in which a message 280 is transmitted from an originating computer system 210a over an appropriate originating network 220a to a gateway computer system 240a or 240b for processing.

The processed message is then transmitted over an appropriate remote network 260a to a destination remote device 270a. In this description, "originating" corresponds to the structure on the side of the gateway computer system 240 that originated the data structure whether it be to the left or to the right of the gateway computer systems 240, and "remote" corresponds to the side of the gateway computer system 240 that receives the processed message from the gateway computer system 240 and may also be on the left or right side of the gateway computer system 240.

In the case described above in which the message is generated by the computer system 210a to the left of the gateway computer systems 240 and transmitted to the wireless device 270a to the right of the gateway computer systems 240, structures to the left of the gateway computer systems 240 are considered "originating" structures while structures to the right of the gateways computer systems 240 are considered "remote" structures. However, in a case in which the message flows in the opposite direction being generated by a wireless device to the right of the gateway computer systems 240 and transmitted to a computer system to the left of the gateway computer system, structures to the right of the gateway computer systems 240 are considered "originating" structure while structures to the left of the gateway computer systems 240 are considered "remote" structures.

As mentioned above, the present invention relates to the format conversion of a data structure. Accordingly, embodiments within the scope of the invention include means for generating a data structure. One example of such a means is shown in FIG. 2 as the originating computer system 210a. The originating device 210 may be any one of numerous devices that can output an electronic messages having a data structure of a specific format. As just one particular example, the originating computer system 210a may be a server computer system having a version of Microsoft® Exchange Server loaded thereon. In the case of Microsoft® Exchange Server, the originating computer system 210 may generate messages having e-mail data structures in the Multipurpose Internet Mail Extensions (MIME) format, calendar entries in the iCal format, contact entries in the vCard format and so forth. The type and number of formats in which the message 280 can be generated is limited only by the software and hardware capabilities of the originating computer system 210a. In cases in which many different originating server computer systems exist, the message may be a wide variety of possible original data formats for the message 280.

The scalable environment 200 includes one or more computer systems 210 including computer systems 210a and 210b that output messages that include a data structure having a particular data format. The computer systems 210 may each be structured as described above for computer 120 and include some or all of the components described as being included in the computer 120.

An example of such a message outputted by one or the originating computer systems 210 is illustrated as message 280 in FIG. 2. The message 280 includes an original data structure 283, a content type field 281 that identifies the original format of the data structure 283, and a destination address field 282 that identifies the intended destination for the information contained in the data structure 283. All that is needed of destination address field 282 is that it identifies the location of a remote destination device such as wireless devices 270a or 270b either directly or indirectly by reference to another mechanism such as a look-up table. For example, the address 282 might be a phone number of one of the remote destination devices 270. Alternatively, the address 282 might be more generic such as "John Doe—Cellular Phone" in which the address 282 must be compared to a look-up table to obtain the specific address as described further below. If the message 280 complies with the Internet standard HyperText Transport Protocol ("HTTP"), the content type field 281 will be the content type field common in the header portion of an HTTP message while the destination address field 282 may include a Uniform Resource Locator ("URL") of the destination wireless device.

The message 280 is forwarded from the originating computer system over a corresponding network to one or the gateway computer systems 240. Accordingly, embodiments within the scope of the present invention include a means for transmitting the message 280 from the originating device 210 to the gateway computer system 240. An example of such a means is shown in FIG. 2 as one of the originating networks 220. For example, messages transmitted from the originating computer system 210b would be transmitted over the network 220b while messages transmitted from the originating computer system 210a such as message 280 would be transmitted over the network 220a to the sending queue 230.

The originating network 220 receives the message 280 from the originating device 210 using a protocol compatible with the originating network 220. The originating network 220 may be any medium capable of transmitting the message 280 whether the network be wired, all wireless, or partially wireless. The originating network 220 may be a wide area network, a local area network, or a combination of both and use any protocol such as, for example, HyperText Transport Protocol (HTTP). In another example of the means for transmitting the message from the originating device 210 to the gateway computer system 240, originating device 210 and the gateway computer system 240 are both disposed within a common device such as a common server computer system. In this case, the originating network 220 is located internal to the common server computer system.

Optionally, for scalability purposes, the means for transmitting the message 280 to the gateway 240 may also include a sending queue 230. The sending queue accumulates the messages so that one or more gateway computer systems 240 such as gateway computer system 240a or gateway computer system 240b can read the message from the sending queue 230 when the gateway computer system is ready to process a new message. The gateway computer systems 240 may comprise, for example, a computer like the computer 120 of FIG. 1 and include some or all of the components described as being included in the computer 120. Alternatively, the gateway computer systems 240 may each be implemented in any other suitable processing devices or systems that perform the functions disclosed herein.

Although only two originating networks, originating devices, and gateways are show, it will be apparent from this description that the number of originating devices, originating networks, and gateways may be scaled up or down as appropriate. For example, if each of the gateway computer system 240 is fast enough to process messages from many originating networks, there may be many originating networks inputting messages to the originating queue 230 and a fewer number of gateway computer systems dequeueing messages from the originating queue 230. On the other hand, if each of the gateway computer systems 240 is not fast enough to process messages from an originating network, there may be relatively few originating networks providing messages to the originating queue 230, and a larger number of gateway computer systems dequeueing messages from the originating queue 230. The originating queue 230 may be any queue capable of receiving messages, storing messages, and holding those messages out for dequeueing by the appropriate gateway computer system 240. For example, sending queue 230 might be a Microsoft® Message Queue (MSMQ) developed by Microsoft Corporation.

The gateway computer system 240a or 240b processes the message 280 as described in further detailed below. While the detailed operation of the gateway computer systems 240 is reserved for further discussion below, the general functions performed by the gateway computer systems 240 include converting the data structure from its original data format outputted by one of the originating computer system 210 into a destination data format compatible with one of the destination devices 270, and then routing the altered data structure to the intended destination device. If the data structure flows in the opposite direction, the gateway computer system 240 converts the data structure from its original data format outputted by one of the originating devices 270 into a destination data format compatible with one or the destination computer systems 210, and then routing the altered data structure to the intended destination computer system.

After gateway 240 has manipulated the message 280 to be in a format recognized by a remote device 270 or 271, the message 280 is transmitted to the remote device. Accordingly, embodiments within the scope of the present invention include means for transmitting the message 280 to a remote device. An example of this means is shown in FIG. 2 as a remote network 260a or 260b. For example, if the destination remote device is remote device 270b, the message is transmitted over the remote network 260b to the remote device. However, as shown in FIG. 2, if the destination remote device is remote device 270a, the message is transmitted over the remote network 260a to the remote device.

The gateway 240 transmits the reformatted message 280 using a protocol compatible with the particular remote network described, such as 260a or 260b. The remote networks may be any network capable of transmitting the message 280 to the remote devices whether all wired, all wireless, or partially wireless. The remote network may be a wide area network, a local area network, or a combination of both and may use any protocol such as, for example, HTTP, or proprietary wireless carrier protocols. Since wireless carriers typically have their own proprietary protocols, and since there are many types of wireless devices each recognizing their own data formats, the flexible gateway 240 of the present invention is particularly useful in communicating with wireless devices.

Optionally, for scalability purposes at the remote side of gateway 240, the means for transmitting the message to the remote device may also include a remote queue such as remote queue 250. The remote queue 250 may receive messages from several gateways and may provide those messages to several remote networks as shown in FIG. 2. Thus, if the gateway 240 is fast enough to process messages for many remote networks, there may be relatively few gateway computer systems inputting messages to the remote queue 250 and a larger number of remote networks that receive messages from the remote queue 250. On the other hand, if the gateway computer system 240 is not fast enough to process messages for a single remote network, there may be a larger number of gateway computer systems inputting messages to the remote queue 250, and a relatively small number of remote networks drawing messages from the remote queue 250. The remote queue 250 may be any queue capable of receiving, storing, and providing the message 280 to the remote network 260. For example, proximate queue 250 might be a Microsoft® Message Queue (MSMQ) developed by Microsoft Corporation.

After the message 280 is transmitted over the appropriate one of the remote networks 260, the message is received by the destination remote device 270. Accordingly, embodiments within the scope of the present invention include means for receiving the message 280. This means is shown in FIG. 2 as one of remote devices 270. The remote devices 270 may be any wireless device such as a cellular phone with or without alphanumeric text receiving capability, a text pager, a lap top computer, a hand held computer, or any other wireless device. The remote devices 270 may also be a "wired" device such as a desk top computer, a conventional telephone, a computer server, or any other wired device. In this description and in the claims, a "wired" device includes any device that is not wireless and that is capable of receiving an electronic message.

Figure 3:
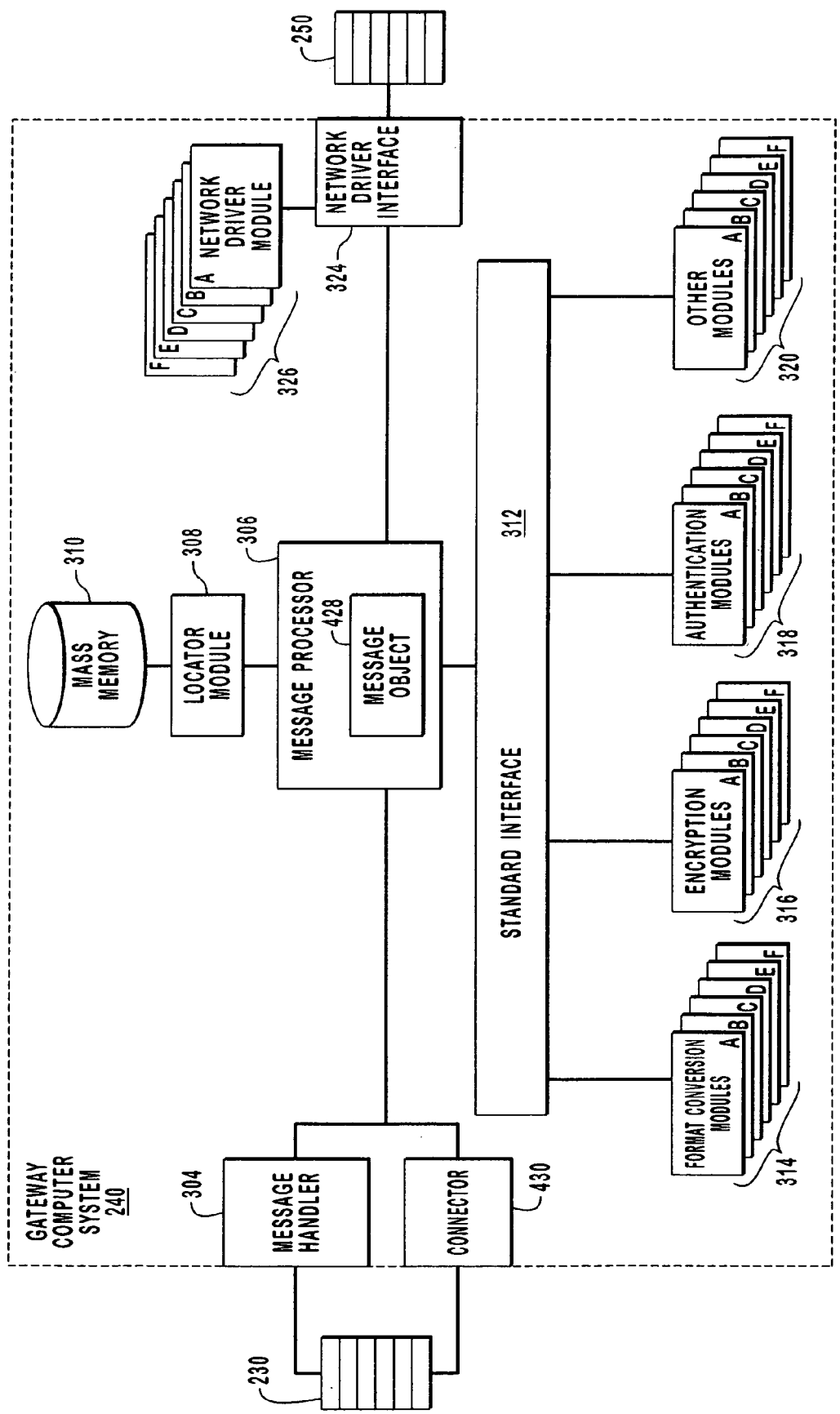
FIG. 3 is a more detailed schematic diagram of the gateway computer system of FIG. 2 in which the gateway computer system has a locator module and is capable of calling through a standardized interface from libraries of format conversion modules and other types of modules.

FIG. 3 is a more detailed schematic diagram of the gateway computer system 240 with accompanying queues 230 and 250 of FIG. 2. The gateway 240 may represent gateway 240a and/or gateway 240b of FIG. 2. An originating message handler 304 dequeues the message 280 from the originating queue. In the case, where the message is sent from one of the computer system 210 to a computer system 270, the originating queue will be the originating queue 230 of FIG. 3. The originating message handler 304 feeds the message 280 to a message processor 306. Devices and modules for reading data from a queue and writing the message to another unit are well-known to those of ordinary skilled in the art.

The message processor 306 uses the locator module 308 to access information in the mass memory 310. The message processor 306 interfaces with format conversion modules A–F in a format conversion module library 314 through a standard interface 312. The message processor 306 may also use the standard interface 312 to communicate with other modules such as encryption modules A–F in an encryption module library 316, authentication modules A–F in an authentication modules library 318 and other modules A–F in an other modules library 320. The message processor 306 uses a network driver interface 324 to interface with one of the network driver modules A–F from the network driver library 326. Note that although interface 312 is shown in box form, the interface really represents a standardized structure for calling modules and retrieving information. These calling functions may be performed using an Application Program Interface or API.

The specific operation of an example gateway 240 is now described. The originating computer system 210a or 210b provides the message 280 to the gateway 240. The message 280 includes a data structure 283 that is in a certain format generated by the originating computer system 210. However, the destination wireless device 270 may not be able to properly interpret the data structure 283 in its original format. According, the gateway computer system 240 converts the data structure 283 from the original format it received from the originating computer system 210 into a destination format that is compatible with the destination wireless device.

Figures 4, 5, 6:
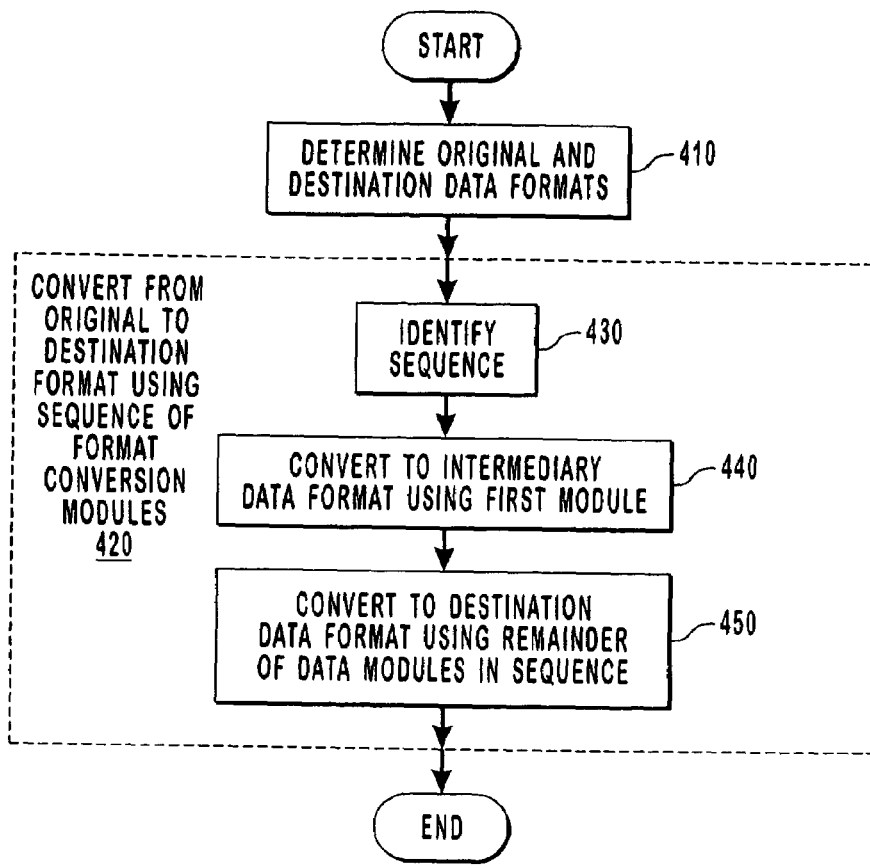
FIG. 4 illustrates a flowchart of a method for converting a data structure from an original data format into a destination format using a sequence of format conversion modules.
FIG. 5 illustrates a data structure of a table that correlates destination addresses to destination data formats.
FIG. 6 illustrates a data structure of a table that represents the capabilities of each of the format conversion modules.

FIG. 4 illustrates a flowchart of such a method. First, the gateway computer system 240 determines the original format of the data structure and the destination format of the data structure (step 410). Then, the gateway computer system 240 performs a step for converting the data structured from the original format into the destination format using a sequence of format conversion modules (step 420). Specifically, the gateway computer system 240 identifies a sequence of data conversion modules of the format conversion module library that, when executed in sequence, converts the data structure from the original data format into the destination data format (step 430). The gateway computer system 240 then converts the data structure from the original data structure into an intermediate data structure by using the first conversion module in the sequence (step 440). Then, the gateway computer system 240 converts the data structure from the intermediate data format into the destination data format by executing the remainder of the sequence in series (step 450).

Each of these acts and steps will now be described in further detail. First, the gateway computer system determines the original data format of the data structure within the message (step 410). The original data structure may be determined by reading the content type field 281 within the message 280. Typically, the content type field would identify the original data format of the data structure included within the message. For example, the content type field may specify an original data format such as "vCard" which is a common data format for contact information. This content type field may be read by, for example, the message processor 306 of the gateway computer system 240 (FIG. 3).

The destination data format is a data format that is recognized by the destination device. For example, suppose that the destination wireless device recognizes contact information in a proprietary data format fictionally called herein "CONTACT3" format. The destination data format may be determined by first reading the destination address. The message processor 306 may accomplish this by first reading the address field 282 of the message 280. Then, the message processor queries the locator module 308 for the destination data format recognized by the addressed destination wireless device. The locator module 308 would then search a database structure contained within the mass memory 310 that correlates addresses to data formats.

FIG. 5 illustrates a data structure that correlates addresses to data formats and other registration data. The address field 510 includes the address which may be in the form of a phone number, Uniform Resource Locator, or other addressing mechanism. In this example, suppose that the destination address is 1-800-555-1212 which represents the phone number of a destination mobile phone. The locator module 308 may consult the corresponding data format field 520 of the data structure to determine that the mobile phone only recognizes data in the "CONTACT3" data format. The locator module 308 then returns this resulting destination data format to the message processor 308 thus completing the act of determining the original and destination data formats (step 410). New devices may register with the gateway computer system 240 when those new devices are to receive message from and transmit messages to the gateway computer system 240. The new device may provide its address for the address field 510, any recognized data format for the data format field 520, and any other useful registration information for the registration data field 530 at the time the new device registers with the gateway computer system 240.

Once the original and destination data format have been determined, the gateway computer system 240 then performs the step for converting the data structure from the original format into the destination format using a sequence of format conversion modules (step 420). In so doing, the gateway computer system 430 first determines the sequence of format conversion modules among the library of format conversion modules 314 that, when executed in sequence, converts the data structure from the original data format into the destination data format.

In so doing, a record of the capabilities of each of the format conversion modules is kept in a storage device such as mass memory 310. FIG. 6 illustrates a data structure which includes a identifier field 610 which identifies a format conversion module for each row. A format input field 620 identifies the data format that the corresponding format conversion module accepts as input. A format output field 630 identifies the data format that the corresponding format conversion module outputs. The locator module 308 accesses the data structure of FIG. 6 to determine a sequence of data format conversion modules that results in the original data format being converted into the destination data format.

Figure 7A:
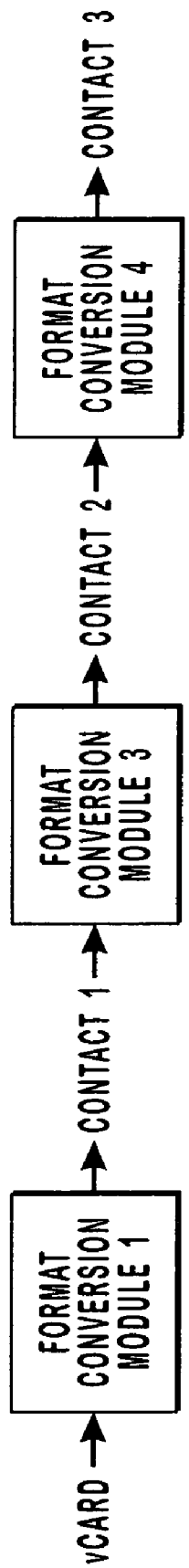
FIG. 7A represents one example of a sequence of format conversion modules that may be executed in series to convert from an original format to a destination format.
Figure 7B:
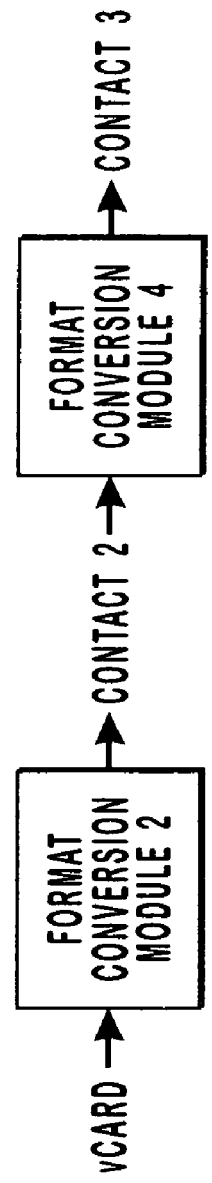
FIG. 7B represents another example of a sequence of format conversion modules that may be executed in series to convert from an original format to a destination format.

For example, suppose that the locator module 308 was given the task of converting a data structure from the "vCard" format into the "CONTACT3" data format. There is no single format conversion module that is capable of such as conversion on its own. However, there are format conversion modules that can convert from V-Card to CONTACT1, from vCard to CONTACT2, from CONTACT 1 to CONTACT2, and from CONTACT2 to CONTACT3. In this example, there are two sequences that satisfy the conversion. One sequence is module 1 to convert from vCard to CONTACT1, then module 3 to convert from CONTACT1 to CONTACT2, and finally module 4 to convert from CONTACT2 to CONTACT3. This sequence is represented in FIG. 7A. Another sequence is module 2 to convert from V-Card to CONTACT2 and then module 4 to convert from CONTACT2 to CONTACT3. This sequence is represented in FIG. 7B.

Any known method for determining a sequence will suffice for use with the present invention. Desired attributes of such a method is that it be executed quickly so that the sequences can be determined and executed dynamically as each message is received so that the messages can be received, converted, and transmitted quickly to facilitate rapid communication between computer systems. For example, methods that produce the sequence shown in FIG. 7B may be preferred over the sequence shown in FIG. 7A unless format conversion module 2 takes longer to execute than format conversion modules 1 and 3 executed in series.

Once the sequence is determined (step 430), the message processor 308 executes the first format conversion module in order to convert the data structure from the original data format into an intermediary data format (step 440). In the sequence of FIG. 7A, the execution of the format conversion module 1 converts the data structure from the vCard format into the CONTACT1 data format. In the sequence of FIG. 7B, the execution of the format conversion module 2 converts the data structure from the vCard format into the CONTACT2 data format.

Subsequently, the remainder of the sequence of format conversion modules is executed in series to convert the data structure from the intermediary data format into the destination data format (step 450). For example, in the sequence of FIG. 7A, format conversion modules 3 and 4 are executed in series to convert the data structure from CONTACT 1 to CONTACT2, and then from CONTACT2 to CONTACT3. In the sequence of FIG. 7B, the format conversion module 4 is executed to convert the data structure from CONTACT2 to CONTACT3.

Thus, the principles of the present invention enable the conversion of messages from one format to another even if there is no single format conversion module that can alone accomplish the desired conversion. Thus, the gateway computer system may accomplish desired conversions with smaller format conversion libraries. Furthermore, the gateway computer system may be upgraded to convert to a new data format with greater ease. Thus, the present invention is particularly useful in computer systems that communicate with networks such as wireless networks in which there is little standardization in data formats from one device to the next.

For example, suppose that there are 1000 possible original data formats. In computer systems in which a single format conversion module is used to convert from the original to the destination data format, the introduction of a new data format would require 1000 new format conversion modules to be written. Furthermore, these 1000 new format conversion modules would need to be stored to accommodate any possible conversion into the new data format.

The present invention enables the new data format to be introduced by crafting just one format conversion module that converts from an intermediary data format that the computer system knows how to generate into the new data format. For example, suppose that the gateway computer system 240 could convert from vCard to CONTACT1, but not CONTACT2, the introduction of a new data format CONTACT2 would require only a single format conversion module that converts from CONTACT1 to CONTACT2. The alternative would be to author a format conversion module for each possible original destination format to convert into the new data format CONTACT2.

Thus, the principles of the present invention save developer time when introducing new data formats, and reduce the amount of memory that computer system must use to store format conversion modules.

In one embodiment, the gateway computer system 240 performs more than the content translation (i.e., format conversion) described above, but also performs network and protocol translation as well.

According to the well-recognized Open Systems Interconnect (OSI) standard, the communication of data can be broken down into seven relatively distinct layers, each higher layer adding functionality to the lower levels.

Level 1 (the lowest level) in the OSI model is often referred to as the physical layer. This layer concerns the functionality needed to physically transmit an unstructured bit stream over a physical link. It invokes such parameters as signal voltage swing and bit duration. It deals with the mechanical, electrical, procedural characteristics to establish, maintain and deactivate the physical link.

Level 2 in the OSI model is often referred to as the link layer. This layer adds reliability and structure to the delivery of data across the physical link. It sends blocks of data (frames) with the necessary synchronization, error control and flow control. Thus, while the physical layer (level 1) is concerned with just the delivery of data, layer 2 is concerned with making the delivery reliable.

Level 3 in the OSI model is often referred to as the network layer. This layer adds functionality for the delivery of data from source node to destination node even though multiple physical links may be traversed in the delivery of the data. The network layer functionality includes the routing and switching necessary for the delivery of data.

Level 4 of the OSI model is often referred to as the transport layer. This layer involves functionality for the transparent transfer of data between end points. It provides end-to-end error recovery and flow control. The transport layer is the layer that partitions larger messages into smaller data packets for transfer across a network and then recombines the partitioned data for presentation back up the OSI model.

Level 5 of the OSI model is often referred to as the session or protocol layer. This layer involves the control structure for communication between applications. It establishes, manages and terminates connections (sessions) between cooperating applications. While the lower levels control individual data transfers, the session can involve a number of message exchanges.

Level 6 of the OSI model is often referred to as the presentation layer. This layer performs generally useful transformations on data to provide a standardized application interface and to provide common communications services. It provides services such as encryption, text compression and reformatting.

Level 7 of the OSI model is often referred to as the application layer. This layer receives data from and provides data to the user of the system.

Figure 8:
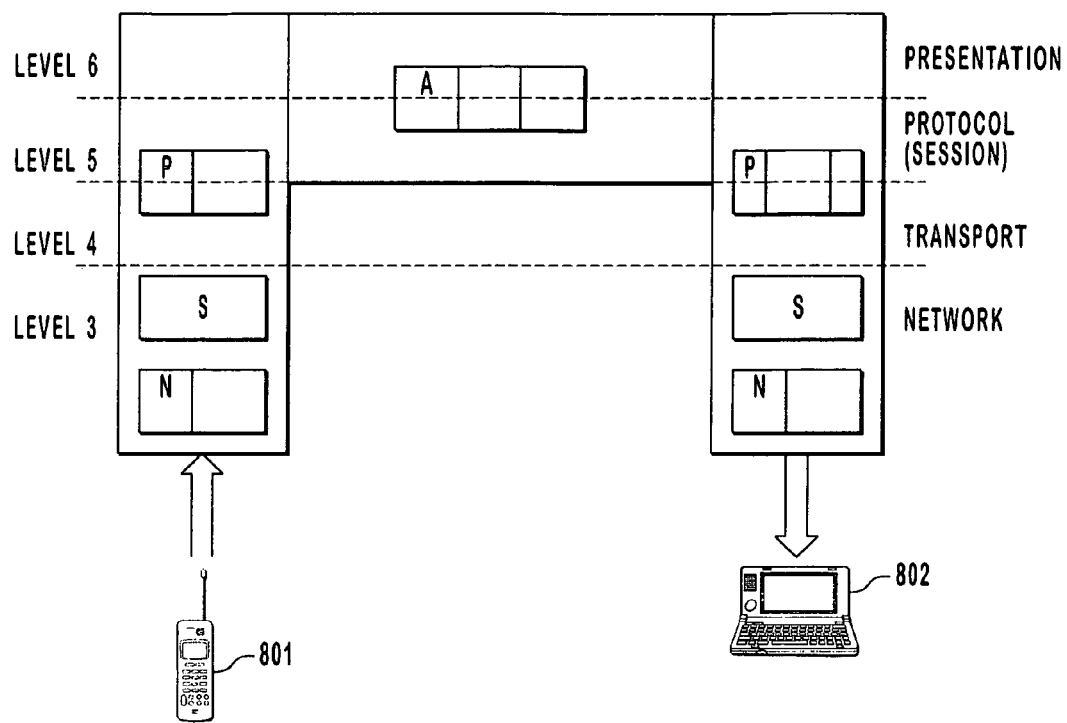
FIG. 8 schematically shows protocol stacks traversed in communicating between a sending device and a receiving device.

FIG. 8 schematically illustrates the translation functions performed by the gateway computer system 240 as the gateway computer system forwards data from device 801 to device 802. The translation functions performed by the gateway computer system generally correspond to levels 3, 4, 5 and 6 of the OSI model. The modules that enable such translation include network driver modules N, system modules S, protocol modules P, and content translation modules A. The system module S typically performs billing and logging information.

Figure 9:
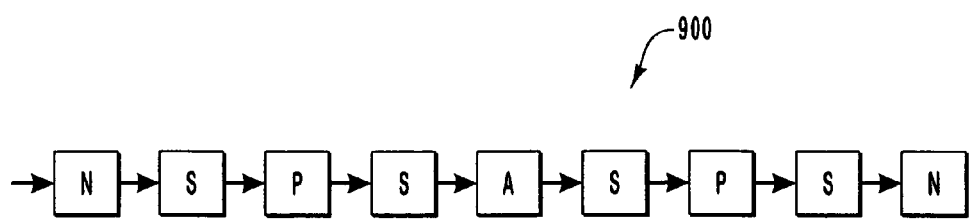
FIG. 9 schematically illustrates a translation chain traversed in communicating between a sending device and a receiving device.

FIG. 9 illustrates an embodiment of a translation chain 900 traversed by data in order to be delivered from the device 801 to the device 802. First, the data traversed up through the OSI layers. The data is received by a network module N that is compatible with the network from which the message is received. The systems module S then logs this action. The packet is then provided to the protocol module P where it is received according to the protocol that was used to transmit the message to the gateway computer system. The system module S then logs the receipt of the packet at the protocol module P. Then, the content translation modules A perform reformatting of the data as described above, and any desired encryption or compression. The system module S again logs this action.

The data is then ready to traverse back down the OSI layers for delivery to the destination device 802. In so doing, the locator module is consulted to determine the appropriate protocol and network modules that are to be used when communicating messages to the device 802. The data then passes to the protocol module P that is compatible with delivery to the destination device 802. The system module S then logs this action. Then, the data passes to the network module N that is compatible with delivery to the destination device 802. The network module is then used to transmit the message to the destination device 802.

Thus, the gateway computer system is useful in dynamic content translation as well as dynamic protocol and network translation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a gateway computer system coupled between at least one computer system and at least one remote wireless device, a method of the gateway computer system dynamically converting data from a first format as received at the gateway computer system from an originating computer system into a second data format compatible with a remote wireless device prior to transmitting the data to the remote wireless device so that the remote wireless device does not have to convert the data into the second data format, the method comprising:

receiving a message from an originating computing system that includes data in a first data format and that is intended for a remote wireless device that has an associated telephone number;

examining the message and identifying the telephone number of the remote wireless device, which is included as part of the message;

determining, based in part on the telephone number, that the wireless device only recognizes data in one or more formats that are different than the first data format;

identifying a sequence of format conversion modules that, when executed in sequence, converts the data from the first data format into a second data format that is recognized by the remote wireless device, wherein identifying is based on the telephone number associated with the remote wireless device;

converting the data from the first data format into an intermediate data format using a first format conversion module in the sequence of format conversion modules; and converting the data from the intermediate data format into the second data format using at least one second format conversion module in the sequence of format conversion modules, each of the second format conversion modules converting the data into different formats;

upon converting the data to the second data format, transmitting the data to the remote wireless device having the associated telephone number.

2. A method in accordance with claim 1, further including identifying the first data format by reading a content type field associated with the data.

3. A method in accordance with claim 1, wherein identifying the sequence comprises:

an act of reading the telephone number from a destination address field associated with the data;

an act of querying a database for a data format recognized by the remote wireless device that is represented by the telephone number within the destination address field; and an act of determining that the resulting data format returned from database is the second data format.

4. A method in accordance with claim 1, wherein the originating computer system comprises a server computer system.

5. A method in accordance with claim 1, wherein the originating computer system comprises a wireless device.

6. A method in accordance with claim 5, wherein the remote wireless device comprises a server computer system.

7. A method in accordance with claim 1, further comprising the following:

an act of receiving the data using a first protocol module that is compatible with receiving data from the originating computer system; and an act of determining a second protocol module that is compatible with delivering data to the remote wireless device; and an act of transmitting the converted data to the remote wireless device using the second protocol module.

8. A method in accordance with claim 1, further comprising the following:

an act of receiving the data using a first network driver module that is compatible with receiving data from the originating computer system; and an act of determining a second network driver module that is compatible with delivering data to the remote wireless device; and an act of transmitting the converted data to the remote wireless device using the second network driver module.

9. A computer program product comprising one or more computer-readable media having computer-executable instructions that, when executed by a processor, implement the method recited in claim 1.

10. A computer-program product in accordance with claim 9, wherein the computer-readable medium comprises a physical storage medium.

11. A computer-program product in accordance with claim 9, wherein the act of identifying the first data format comprises an act of reading a content type field associated with the data.

12. A computer-program product in accordance with claim 9, wherein identifying the second data format comprises:

an act of reading the telephone number from a destination address field associated with the data;

an act of querying a database for a data format recognized by the remote remote wireless device that is represented by the telephone number within the telephone number field; and an act of determining that the resulting data format returned from database is the second data format.

13. A computer-program product in accordance with claim 9, further comprising computer-executable instructions for performing the following:

an act of receiving the data using a first protocol module that is compatible with receiving data from the originating computer system; and an act of determining a second protocol module that is compatible with delivering data to the remote wireless device; and an act of transmitting the converted data to the remote wireless device using the second protocol module.

14. A computer-program product in accordance with claim 9, further comprising computer-executable instructions for performing the following:

an act of receiving the data using a first network driver module that is compatible with receiving data from the originating computer system; and an act of determining a second network driver module that is compatible with delivering data to the remote wireless device; and an act of transmitting the converted data to the remote wireless device using the second network driver module.

15. A method as recited in claim 1, wherein the act of identifying the sequence is based on an amount of time it will take to convert the data from the first data format into the second data format.

16. A method as recited in claim 1, wherein the second data format corresponds to a network protocol that is proprietary with the remote wireless device.

17. A method as recited in claim 1, wherein the message that is converted from the first format into the second format traverses network OSI layers during the conversion of the message and such that network and protocol translation occurs to the message in addition to data conversion.

18. A method as recited in claim 1, wherein the message that is converted from the first format into the second format is converted in a presentation level 6 of a standard OSI layers model.

19. A method as recited in claim 1, wherein the wireless device comprises a mobile telephone.

20. A method as recited in claim 1, wherein the data is transmitted to the remote wireless device having the associated telephone number over a wireless network.

21. In a gateway computer system coupled between at least one originating computer system and at least one remote wireless device, a method of the gateway computer system dynamically converting data in a first format as received at the gateway computer system from an originating computer system into a second data format compatible with a remote wireless device prior to transmitting the data to the remote wireless device so that the remote wireless device does not have to convert the data into the second data format, the method comprising the following:

receiving a message from from an originating computing system that includes data in a first data format and that is intended for a remote wireless device that has an associated telephone number;

examining the message and identifying the telephone number of the remote wireless device, which is included as part of the message;

determining, based in part on the telephone number, that the remote wireless device only recognizes data in one or more formats that are different than the first data format;

an act of identifying a plurality of sequences of format conversion modules that each, when executed in sequence, converts the data from the first data format into a second data format comprising a format that the remote wireless device recognizes, wherein identifying the plurality of sequences is based on the telephone number associated with the remote wireless device; and a step for converting the data from the first data format into the second data format using one of the plurality of the sequences of format conversion modules; and upon converting the data to the second data format, transmitting the data to the remote wireless device having the associated telephone number.

22. A method in accordance with claim 21, wherein the step for converting the data from the first data format into the second data format comprises the following:

an act of converting the data from the first data format into an intermediate data format using the first format conversion module in the one of the plurality of sequences of data conversion modules; and an act of converting the data from the intermediate data format into the second data format using at least the second format conversion module in the one of the plurality of sequences of data conversion modules.

23. A method in accordance with claim 21, wherein the first data format is identified from a content type field associated with the data.

24. A method in accordance with claim 21, wherein the act of identifying the second data format comprises the following:

an act of reading the telephone number from a destination address field associated with the data;

an act of querying a database for a data format recognized by the remote wireless device that is represented by the telephone number within the telephone number field; and an act of determining that the resulting data format returned from database is the second data format.

25. A method in accordance with claim 21, wherein the originating computer system comprises a server computer system.

26. A method in accordance with claim 21, wherein the originating computer system comprises a wireless device.

27. A method in accordance with claim 21, wherein the originating computer system and the remote wireless device both comprise server computer systems.

28. A method in accordance with claim 21, further comprising the following:

an act of receiving the data using a first protocol module that is compatible with receiving data from the originating computer system; and an act of determining a second protocol module that is compatible with delivering data to the remote wireless device; and an act of transmitting the converted data to the remote wireless device using the second protocol module.

29. A method in accordance with claim 21, further comprising the following:

an act of receiving the data using a first network driver module that is compatible with receiving data from the originating computer system; and an act of determining a second network driver module that is compatible with delivering data to the remote wireless device; and an act of transmitting the converted data to the remote wireless device using the second network driver module.

30. A computer program product comprising one or more computer-readable media having computer-executable instructions that, when executed by a processor, implement the method recited in claim 20.

31. A computer-program product in accordance with claim 30, wherein the computer-readable medium comprises a physical storage medium.

32. A method as recited in claim 21, wherein the step for converting the data from the first data format into the second data format using one of the plurality of the sequences includes selecting the one of the plurality of sequences based on an amount of time it will take to convert the data from the first data format into the second data format.

33. A gateway computer system configured to be coupled between at least one originating computer system and at least one remote wireless device, the gateway computer system configured to receive data having a first data format from an originating computer system and then to subsequently transmit the data in a second format to a remote wireless device such that the remote wireless device does not have to convert the data into the second data format, the gateway computer system comprising:

means for receiving a message from an originating computing system that includes data in a first data format and that is intended for a remote wireless device and that has an associated telephone number;

means for examining the message and identifying the telephone number of the remote wireless device, which is included as part of the message;

means for determining, based in part on the telephone number, that the remote wireless device only recognizes data in one or more formats that are different than the first data format;

means for identifying an address of the remote wireless device to which the data is addressed;

a plurality of format conversion modules including:
- a plurality of first format conversion modules configured to convert data having the first data format into intermediate data formats; and
- a plurality of second format conversion modules configured to convert data having the intermediate data formats into a second data format comprising a format that the remote wireless device recognizes; and means for identifying different sequences of first and second format conversion modules that are a subset of the plurality of format conversion modules and that, when executed in sequence, result in the data being converted from the first data format into the second data format, wherein identifying the different sequences is based upon the telephone number associated with the remote wireless device, and wherein the data, upon being converted, is transmitted to the wireless device having the associated telephone number.

34. The gateway computer system in accordance with claim 33, wherein the originating computer system comprises a server computer system.

35. The gateway computer system in accordance with claim 33, wherein the originating computer system comprises a wireless device.

36. The gateway computer system in accordance with claim 35, wherein the remote wireless device comprises a server computer system.

37. The gateway computer system in accordance with claim 33, wherein the originating computer system and the remote wireless device both comprise server computer systems.

* * * * *

UNITED STATES PATENT AND TRADEMARK OFFICE
CERTIFICATE OF CORRECTION

| | | |
|---|---|---|
| PATENT NO. | : 7,046,691 B1 | Page 1 of 1 |
| APPLICATION NO. | : 09/609269 | |
| DATED | : May 16, 2006 | |
| INVENTOR(S) | : Donald Kadyk et al. | |

It is certified that error appears in the above-identified patent and that said Letters Patent is hereby corrected as shown below:

On the Title Page, Item (56), under "Foreign Patent Documents", line 1, after "10/1998" insert -- H04L/29/06 --.

In column 5, line 42, after "combination" delete "or" and insert -- of --, therefor.

In column 6, line 4, delete "drive-interface" and insert -- drive interface --, therefor.

In column 8, line 54, delete "show" and insert -- shown --, therefor.

In column 10, line 65, delete "structured" and insert -- structure --, therefor.

In column 12, line 22, delete "CONTACT 1" and insert -- CONTACT1 --, therefor.

In column 12, line 59, delete "CONTACT 1" and insert -- CONTACT1 --, therefor.

In column 16, line 35, in Claim 12, delete "remote" before "wireless".

In column 17, line 29, in Claim 21, delete "from" before "an originating".

In column 18, line 45, in Claim 30, delete "claim 20" and insert -- claim 21 --, therefor.

Signed and Sealed this

Thirtieth Day of March, 2010

David J. Kappos
*Director of the United States Patent and Trademark Office*